No. 755,703. PATENTED MAR. 29, 1904.
E. M. SANGER.
BEARING FOR VERTICAL SHAFTS.
APPLICATION FILED JUNE 20, 1903.
NO MODEL.
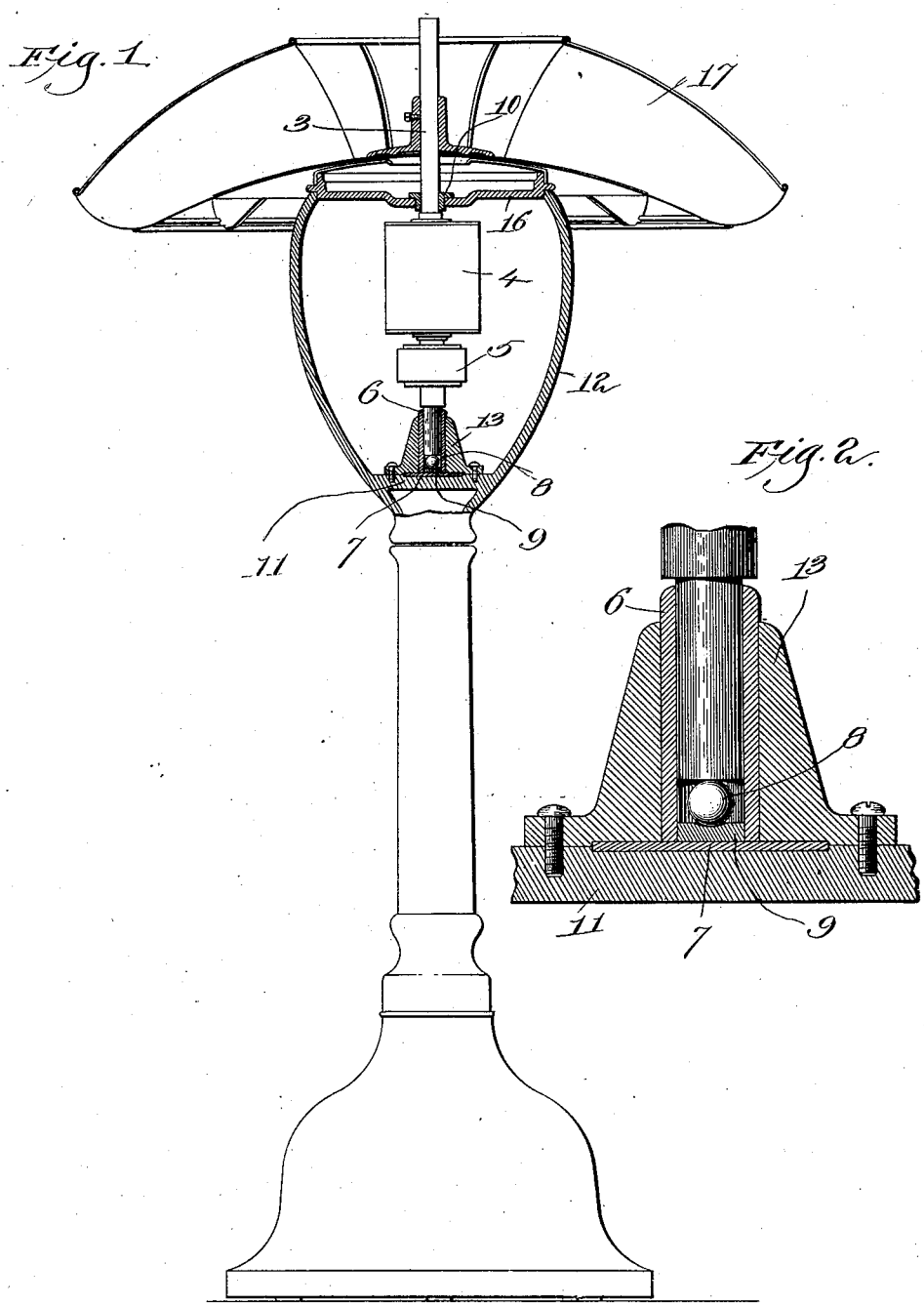

No. 755,703. Patented March 29, 1904.

UNITED STATES PATENT OFFICE.

EUGENE M. SANGER, OF BOSTON, MASSACHUSETTS.

BEARING FOR VERTICAL SHAFTS.

SPECIFICATION forming part of Letters Patent No. 755,703, dated March 29, 1904.

Application filed June 20, 1903. Serial No. 162,312. (No model.)

*To all whom it may concern:*

Be it known that I, EUGENE M. SANGER, a citizen of the United States, residing at Boston, county of Suffolk, State of Massachusetts, have invented an Improvement in Bearings for Vertical Shafts, of which the following description, in connection with the accompanying drawings, is a specification, like numerals on the drawings representing like parts.

This invention relates to bearings for vertical shafts, and has for its object to provide a self-lubricating insulated bearing of this class which is simple in construction.

The bearing comprises a lower bearing member of self-lubricating insulating material in which the lower end of the vertical shaft rests and an upper bearing in the form of a centering-sleeve of similar material through which the upper end of the shaft projects and by which the shaft is centered. To reduce friction, I preferably employ a ball in the lower bearing member, on which the shaft rests. This form of lower bearing member receives the lower end of the shaft and besides supporting it also insulates it, and as the centering-sleeve is also of insulating material it will be observed that the entire surface is insulated. This makes the bearing especially useful for armature-shafts of electric motors in which the shaft is arranged vertically, because it requires practically no attention, so far as lubrication is concerned, and it also thoroughly insulates the armature-shaft.

The invention may be embodied in a great number of different constructions, and for the purposes of illustration I have shown my invention as embodied in an electric fan having a vertical motor-shaft.

Figure 1 of the drawings is a vertical section through an electric fan having a vertical motor-shaft and showing my improved bearings for the shaft, and Fig. 2 is an enlarged view of the lower or step bearing.

3 designates the vertical shaft, which is supported in my improved bearings, and, as herein illustrated, said shaft is an armature-shaft of an electric motor and has mounted thereon the usual armature 4 and commutator 5. In the interests of clearness I have omitted the field-magnets from the drawings.

The lower end of the shaft 3 is supported in a bearing member of self-lubricating insulating material, and in this form of the invention said bearing member comprises a sleeve 6, of this material, having a cylindrical bore of a size just to fit the lower end of the shaft 3, and a base piece or plate 7, of the same material, on which the sleeve 6 rests and which takes the weight of the shaft 3. To reduce friction, I preferably support the end of said shaft 3 directly on a ball 8, which in turn rests upon the concave face of a metallic washer or disk 9, the latter disk being supported directly upon the plate or disk 7 and being confined within the sleeve 6. The plate 7 and the sleeve 6 when brought together form a socket, into which the end of the shaft rests and by which the shaft is entirely surrounded. These two parts form, in effect, a cup-shaped bearing, which not only supports the lower end of the shaft but also thoroughly insulates said end of the shaft. The upper end of the shaft 3 is centered by a suitable sleeve 10, through which the shaft passes, said sleeve being of some suitable self-lubricating insulating material.

I have found from experiments that wood impregnated with oil forms a very satisfactory material for the bearing, as it has self-lubricating properties and is also an insulator. This saturation or impregnation of the wood with oil may be accomplished in any suitable way, as by boiling the wood in oil.

Where the invention is applied to a fan of the character herein illustrated, the disk or plate 7 will be suitably supported upon the base portion 11 of the motor-casing 12, and some suitable means—such, for instance, as the housing 13—will be employed to maintain the sleeve 6 in its proper position. The upper centering-sleeve 10 is supported in the upper head 16 of the motor-casing.

17 designates any suitable fan situated outside of the motor-casing and fast to the shaft 3, said fan being of course entirely out of contact with the motor-casing.

The only stationary parts of the device with which the motor-shaft has contact are the sleeves 10 and 6 and antifriction-ball 8, and as the ball 8 is insulated from the motor-casing it follows that the armature-shaft will be completely insulated.

The self-lubricating properties of the bearings make a bearing which requires no attention, so far as lubrication is concerned, and one which is therefore especially adapted for electric fans which are running a large part of the time and which usually get little or no attention.

Instead of using a housing 13 for the sleeve 6 which is separate from the sleeve I may make said sleeve thicker through and provide it with suitable means for securing it to the stationary support. In this case no separate housing is necessary.

While I have shown herein one way in which my invention may be applied, I do not wish to be restricted to what is illustrated in the drawings, as obviously this form of bearing may be used in any other construction.

Having described my invention, what I claim as new, and desire to secure by Letters Patent, is—

1. A vertical shaft, a bearing member of self-lubricating insulating material and having a socket into which the lower end of the shaft sets, said bearing member insulating said end of the shaft and a centering-sleeve of similar material through which the shaft extends and by which it is centered and at its upper end insulated.

2. A vertical shaft, a bearing member of self-lubricating insulating material having a socket into which the lower end of said shaft sets, a ball in said socket on which the end of the shaft rests, and a centering-sleeve of similar material through which the shaft extends and by which its upper end is centered, said bearing member and centering-sleeve operating to insulate the shaft.

3. A self-lubricating insulated bearing for vertical motor-shafts, comprising a plate of self-lubricating insulating material, a sleeve of similar material supported by the plate and into which the lower end of the shaft extends, the weight of said shaft being supported by said plate, and a centering-sleeve also of the same material through which the shaft extends and by which its upper end is centered, said sleeves and plate serving to insulate the shaft.

4. In a self-lubricating insulated bearing for vertical shafts, a plate of self-lubricating insulating material, a sleeve of similar material supported by the plate and into which the lower end of the shaft sets, a metallic disk in said sleeve and resting upon said plate, an antifriction-ball on said disk, said ball furnishing the support for the end of the vertical shaft, and a centering-sleeve of self-lubricating insulating material through which the upper end of the shaft extends and by which it is centered, whereby the shaft is completely insulated.

In testimony whereof I have signed my name to this specification in the presence of two subscribing witnesses.

EUGENE M. SANGER.

Witnesses:
   Louis C. Smith,
   John C. Edwards.